Patented Oct. 30, 1934

1,978,948

UNITED STATES PATENT OFFICE 1,978,948

BINDING COMPOSITION

George F. Kennedy, Wilmington, Del., and Joseph N. Borglin, Kenvil, N. J., assignors to Hercules Powder Company, Wilmington, Del., a corporation of Delaware No Drawing. Application August 29, 1930,
Serial No. 478,790

17 Claims. (Cl. 22—188)

Our invention relates to an improvement in core binding compositions such as are used in foundries. Our invention also contemplates improvement in foundry cores and method of producing. More particularly, our invention relates to a core binding composition involving essentially a suspension of a resin in a vehicle.

Heretofore core binding compositions for use, for example, in ferrous and non-ferrous foundries have been known to include a resin such, for example, as rosin, either as a dry binder or dissolved in kerosene, linseed oil, hydrocarbon oils, etc. Further, in such compositions it has been known to use grade B wood rosin, such, however, being used as a dry binder, since it is insoluble, for example, in kerosene and must of necessity be limed or heat treated at an elevated temperature to prevent reversion to a solid state after pulverization.

Core binders involving a resin as heretofore known have not been entirely satisfactory, since cores produced therefrom are lacking in desirable tensile strength, resistance to moisture, etc. and are relatively uneconomic where the resin is dissolved, since in preparation of the core the solvent is lost.

Now, in accordance with our invention we provide a core binding composition involving essentially a resin carried in suspension in a vehicle, the vehicle desirably having binding properties. In accordance with our invention, we may use almost any resin, as for example, wood or gum rosin, including grade B wood rosin, rosin residue, nigre, etc. As the vehicle, we may use, for example, molasses, invert sugar, carbohydrate solutions and suspensions, etc., etc.

In preparing the core binding material in accordance with our invention the resinous material is finely ground with the vehicle to produce the desired suspension of the resin in the vehicle. Desirably, the resin will be ground with the vehicle in a colloid mill with the production desirably of a colloidal suspension. If desired, the composition may include an alkali, as for example, soda ash, sodium hydroxide, calcium oxide, or the like, which will have the effect of rendering the composition more viscous than where an alkali is not used.

In the practical adaptation of our invention the relative proportions of resin and vehicle may vary widely. Thus, for example, the vehicle may be present in amount within about the range of 10%–90%. Where an alkali, as soda ash, is added, such may be in amount within about the range 0.5%–10%.

As illustrative of the practical adaptation of our invention, for example, said core binding composition may comprise 35%–50% of grade B wood rosin in colloidal suspension in a suitable vehicle as, for example, molasses.

It will be understood that by grade B wood rosin we intend grade B wood rosin of commerce or such, for example, as is obtained by alcohol extraction of steam distilled pine wood, or such as is obtained in the refining of gasoline extracted wood rosin through the use of a selective solvent as disclosed in Letters Patent No. 1,715,088. The colloidal suspension may be produced through the use of a colloid mill.

As illustrative of a practical adaptation of our invention, for example, a suitable core binding composition may comprise 50% rosin and 50% molasses, the rosin being put in colloidal suspension in the molasses by, for example, grinding in a colloid mill. Again, a suitable composition may comprise 34.5% of rosin and 1% soda ash in colloidal suspension in 64.5% molasses.

The 1% of soda ash will be sufficient to neutralize only a part of the acid content of the 34.5% of rosin and the composition will accordingly contain a small amount of sodium abietate together with free abietic acid from the portion of the rosin not neutralized by the soda ash.

In the production of a core using either of the above compositions, for example, 800 g. of sand, 40 g. of the composition and 50 cc. of water are thoroughly mixed. The mixture is molded and then baked for about an hour at about 300° F. desirably on a revolving plate. The baking will set the core and effect the elimination of the water.

It will be noted that the composition in accordance with our invention will be relatively viscous and slow flowing. Where soda ash is included in the composition the viscosity will be substantially increased and the composition will not flow at room temperature, having more or less the characteristics of a grease.

The composition in accordance with our invention will be found to be economically produced and to possess many definite advantages over compositions heretofore used. More particularly, the composition will be found substantially more resistant to moisture and to maintain its strength in a moisture laden atmosphere to a greater extent than similar compositions heretofore known and comprising, for example, molasses and non-resinous material. Further, the core will burn when casting without objectionable fumes. As compared to compositions heretofore known and including a resin as a dry binder, the composition in accordance with our invention has the advantage that the suspended rosin is more finely divided and, therefore, better distributed through the sand. Again, the core will have greater tensile strength and has a green bond which is lacking in dry rosin core binders.

The composition in accordance with our invention will be found to have a very definite advantage over prior compositions, since both components, i. e. the rosin and the vehicle, are core binders in themselves, the moisture content of the core can be removed at relatively low temperature and no constituent of any value is lost in the baking operation.

The composition in accordance with our invention also presents advantage over linseed oil and linseed oil-resin compositions in that it has a lower baking temperature, cheaper ingredients, greater flexibility and is easier and pleasanter to handle.

What we claim and desire to protect by Letters Patent is:

1. A core binding composition including a vehicle having binding properties carrying a resin in suspension.

2. A core binding composition including a vehicle having binding properties carrying rosin in suspension.

3. A core binding composition including molasses carrying a resin in suspension.

4. A core binding composition including molasses carrying rosin in suspension.

5. A core binding composition including a vehicle having binding properties carrying grade B wood rosin in suspension.

6. A core binding composition including molasses carrying grade B wood rosin in suspension.

7. A core binding composition including molasses carrying grade B wood rosin in suspension in amount within about the range 35%–50%.

8. A foundry core composition comprising, in admixture, sand and a vehicle having binding properties carrying rosin in suspension.

9. A foundry core composition comprising, in admixture, sand and molasses carrying grade B wood rosin in suspension.

10. The method of producing a foundry core which includes admixing a suspension of a resin in a vehicle having binding properties, sand and water, molding the mixture and heating to effect elimination of the water.

11. The method of producing a foundry core which includes admixing a suspension of rosin in molasses, sand and water, molding the mixture and heating to effect elimination of the water.

12. A core binding composition including a vehicle carrying a resin in suspension and a quantity of alkali sufficient only to partly neutralize the resin acid.

13. A core binding composition including a vehicle carrying rosin in suspension and a quantity of alkali sufficient only to partly neutralize the abietic acid.

14. A core binding composition including a vehicle having binding properties carrying rosin including free abietic acid and an alkali abietate in suspension.

15. A core binding composition including a vehicle having binding properties carrying a resin including free resin acid and an alkali resinate in suspension.

16. A core binding composition including a carbohydrate solution carrying a resin in suspension.

17. A core binding composition including a carbohydrate solution carrying rosin in suspension.

GEORGE F. KENNEDY.
JOSEPH N. BORGLIN.